United States Patent
Siddiqui et al.

(10) Patent No.: US 11,009,389 B2
(45) Date of Patent: May 18, 2021

(54) OPERATING RE-CONFIGURABLE SOLAR ENERGY GENERATORS FOR INCREASING YIELD DURING NON-IDEAL WEATHER CONDITIONS

(71) Applicant: International Business Machines Corporation, Armonk, NY (US)

(72) Inventors: Talha Ahmad Siddiqui, Bangalore (IN); Samarth Bharadwaj, Bangalore (IN); Shivkumar Kalyanaraman, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 345 days.

(21) Appl. No.: 16/030,029

(22) Filed: Jul. 9, 2018

(65) Prior Publication Data

US 2020/0011731 A1  Jan. 9, 2020

(51) Int. Cl.
*G01W 1/10* (2006.01)
*G01J 1/42* (2006.01)
(Continued)

(52) U.S. Cl.
CPC .......... *G01J 1/4228* (2013.01); *G01J 1/0266* (2013.01); *G01W 1/10* (2013.01); *G05B 15/02* (2013.01); *H02J 3/14* (2013.01); *H02J 3/383* (2013.01)

(58) Field of Classification Search
CPC ....... G01J 1/0266; G01J 1/4228; G01W 1/10; G05B 15/02; H02J 2300/24; H02J 3/004;
(Continued)

(56) References Cited

U.S. PATENT DOCUMENTS 6,269,309 B1 * 7/2001 Buckingham .......... G01W 1/10
702/3
8,785,830 B2  7/2014 Judkins
(Continued)

FOREIGN PATENT DOCUMENTS

JP  2007184354 A  7/2007
WO  2015099857 A1  7/2015
WO  2015104281 A1  7/2015

OTHER PUBLICATIONS

Zaher et al., Optimization of Solar Tracking Systems, World Academy of Science, Engineering and Technology International Journal of Energy and Power Engineering vol. 12, No. 5, 2018.
(Continued)

*Primary Examiner* — Mischita L Henson
(74) *Attorney, Agent, or Firm* — Ryan, Mason & Lewis, LLP

(57) ABSTRACT

Methods, systems, and computer program products for operating re-configurable solar energy generators for increasing yield during non-ideal weather conditions are provided herein. A computer-implemented method includes determining, for each of multiple portions of the sky, by using one or more machine learning algorithms, a respective level of diffuse irradiance corresponding to image data from that portion; identifying one or more portions of the image data corresponding to the multiple portions of sky image data that include a higher level of diffuse irradiance, as compared to other portions of the image data; and configuring one or more solar photovoltaic modules based at least in part on the one or more identified portions of image data that include a higher level of diffuse irradiance.

18 Claims, 9 Drawing Sheets

(51) Int. Cl.
  *H02J 3/14* (2006.01)
  *G05B 15/02* (2006.01)
  *G01J 1/02* (2006.01)
  *H02J 3/38* (2006.01)

(58) Field of Classification Search
  CPC ... H02J 3/14; H02J 3/381; H02J 3/383; H02S 10/00; H02S 10/20
  See application file for complete search history.

(56) References Cited

U.S. PATENT DOCUMENTS

| | | | |
|---|---|---|---|
| 9,406,028 | B2 | 8/2016 | Humann |
| 2007/0084502 | A1 | 4/2007 | Kelly et al. |
| 2008/0236568 | A1 | 10/2008 | Hickerson et al. |
| 2011/0220091 | A1 | 9/2011 | Kroyzer |
| 2012/0035887 | A1* | 2/2012 | Augenbraun ........... G06T 15/06 703/1 |
| 2014/0320607 | A1 | 10/2014 | Hamanm et al. |

OTHER PUBLICATIONS

Lappalainen et al., Photovoltaic mismatch losses caused by moving clouds, Dec. 2017.
Calbo et al., Feature Extraction from Whole-Sky Ground-Based Images for Cloud-Type Recognition, Jan. 2008.
West et al., Short-term irradiance forecasting using skycams: Motivation and development, Dec. 2014.
Fu et al., Design and implementation of the Solar Analyst: an ArcView extension for modeling solar radiation at landscape scales, Jan. 1999.
Lou et al., Prediction of diffuse solar irradiance using machine learning and multivariable regression, Applied Energy 181 (2016) 367-374.
Li et al., Study of models for predicting the diffuse irradiance on inclined surfaces, Jun. 2005.
Vaisala Energy, What is Global Horizontal Irradiance?, https://www.3tier.com/en/support/solar-prospecting-tools/what-global-horizontal-irradiance-solar-prospecting/, 2018.

* cited by examiner

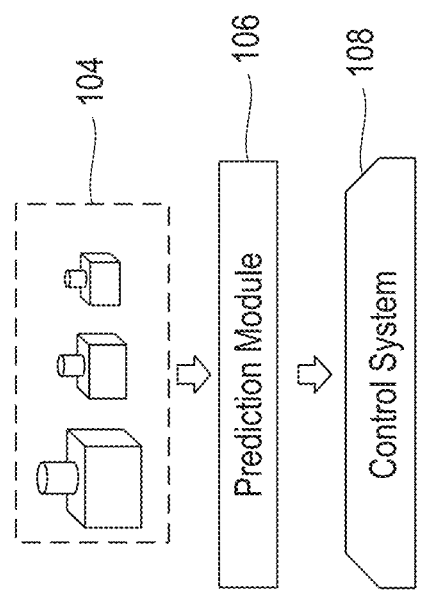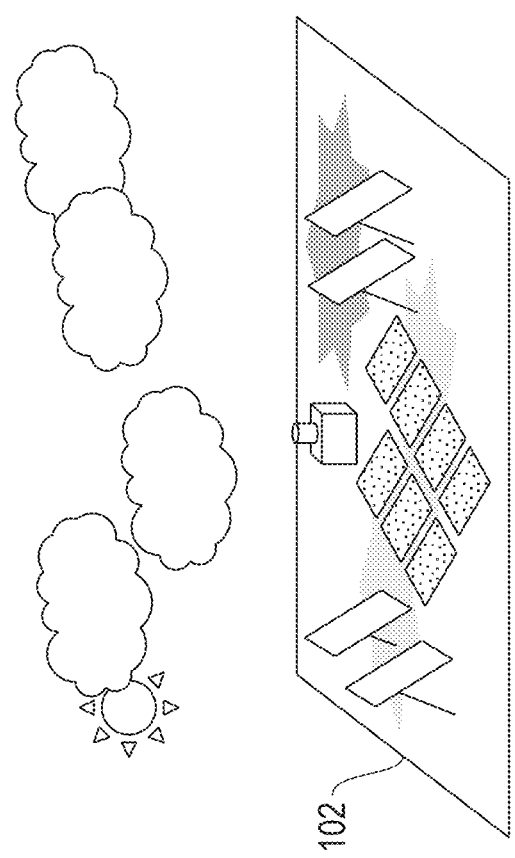
FIG. 1

OPERATING RE-CONFIGURABLE SOLAR ENERGY GENERATORS FOR INCREASING YIELD DURING NON-IDEAL WEATHER CONDITIONS

FIELD

The present application generally relates to information technology, and, more particularly, to renewable energy generation and management.

BACKGROUND

Large solar energy production projects commonly suffer from uncertain yields that can be related to variable weather conditions as well as inefficient grid planning and distribution. In an attempt to increase power production, various configurable add-ons such as reflectors, mirrors etc., are occasionally used in existing approaches. Such configurable add-ons generally require predictions and/or short-term forecasts of solar irradiance, which can be challenging, particularly during cloudy weather conditions. While clear sky models (geometry-based) are applicable on clear days, the azimuth of the sun is typically not indicative of the diffuse irradiance. Diffuse irradiance (DI) can include reflected or diffused light passing through clouds and/or off nearby objects, ground surfaces, etc. DI can also change rapidly with cloud movement, and DI is location- and environment-specific, not correlated with latitude.

SUMMARY

In one embodiment of the present invention, techniques for operating re-configurable solar energy generators for increasing yield during non-ideal weather conditions are provided. An exemplary computer-implemented method can include determining, for each of multiple portions of the sky, by using one or more machine learning algorithms, a respective level of diffuse irradiance corresponding to image data from that portion, wherein the one or more machine learning algorithms comprise at least one regression function that analyzes irradiance vectors from image data corresponding to the multiple portions of the sky, and wherein the determining comprises, for the image data corresponding to each of the multiple portions of the sky, decoupling an irradiance vector into (i) a direct irradiance component and (ii) a diffuse irradiance component. Such a method can also include identifying one or more portions of the image data corresponding to the multiple portions of sky image data that include a higher level of diffuse irradiance, as compared to other portions of the image data, and configuring one or more solar photovoltaic modules based at least in part on the one or more identified portions of image data that include a higher level of diffuse irradiance.

In another embodiment of the invention, an exemplary computer-implemented method can include generating a machine learning model for determining irradiance levels, wherein the machine learning model is based at least in part on (i) sky image data captured over a temporal period and (ii) one or more weather conditions, corresponding to the sky image data, sensed over the temporal period. The method can also include capturing, using multiple cameras, image data specific to one or more regions of sky, sensing one or more transient weather conditions at geographic regions corresponding to the one or more regions of sky, and applying the machine learning model to (i) the captured image data specific to the one or more regions of sky and (ii) the one or more transient weather conditions sensed at the geographic regions corresponding to the one or more regions of sky. Further, the method can include outputting, based on implementation of the machine learning model, (i) sector-by-sector levels of produced diffuse irradiance and (ii) sector-by-sector levels of produced direct irradiance; and configuring one or more solar photovoltaic modules based at least in part on (i) the sector-by-sector levels of produced diffuse irradiance and (ii) the sector-by-sector levels of produced direct irradiance.

Another embodiment of the invention or elements thereof can be implemented in the form of a computer program product tangibly embodying computer readable instructions which, when implemented, cause a computer to carry out a plurality of method steps, as described herein. Furthermore, another embodiment of the invention or elements thereof can be implemented in the form of a system including a memory and at least one processor that is coupled to the memory and configured to perform noted method steps. Yet further, another embodiment of the invention or elements thereof can be implemented in the form of means for carrying out the method steps described herein, or elements thereof; the means can include hardware module(s) or a combination of hardware and software modules, wherein the software modules are stored in a tangible computer-readable storage medium (or multiple such media).

These and other objects, features and advantages of the present invention will become apparent from the following detailed description of illustrative embodiments thereof, which is to be read in connection with the accompanying drawings.

BRIEF DESCRIPTION OF THE DRAWINGS

FIG. 1 is a diagram illustrating system architecture, according to an exemplary embodiment of the invention;

DETAILED DESCRIPTION

Figure 2:
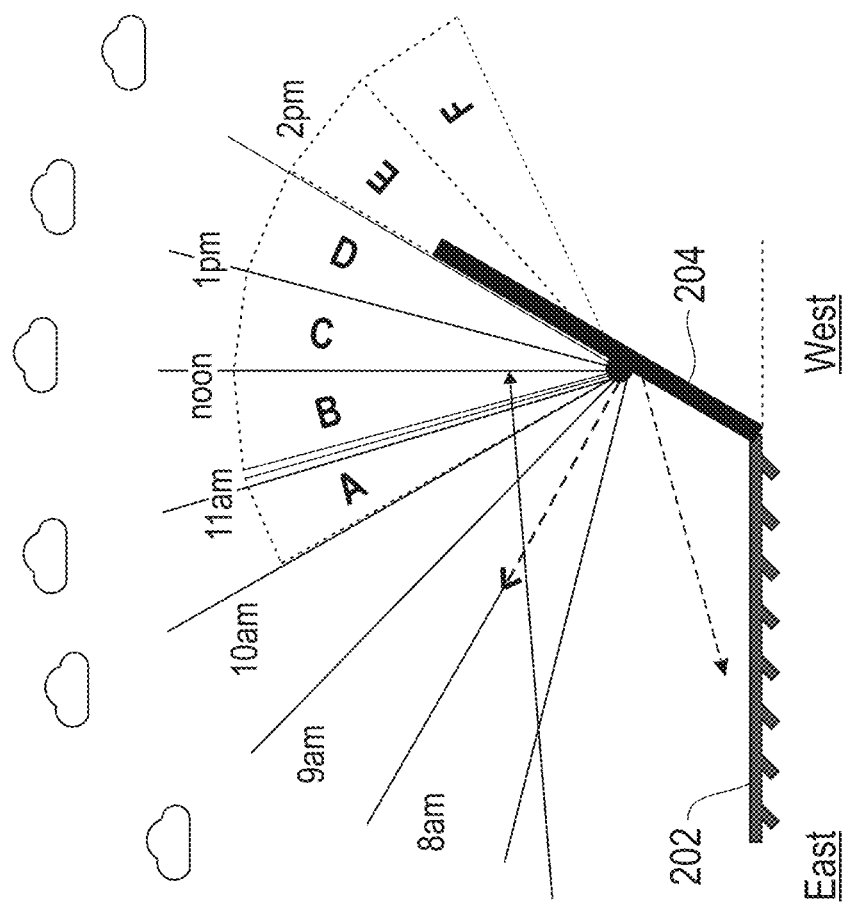
FIG. 2 is a diagram illustrating irradiance angles at different times of day, according to an exemplary embodiment of the invention.

As described herein, an embodiment of the present invention includes operating re-configurable solar energy generators for increasing yield during non-ideal weather conditions. At least one embodiment of the invention includes operating and/or adjusting solar energy generators with one or more re-configurable add-ons, by deploying one or more sky cameras to guide a control system using processed image data obtained from the sky cameras. Such an embodiment includes calculating the (circular) area of sky covered by each sky camera, dividing the (circular) area into different equidistant sectors, and predicting diffuse irradiance via a machine learning regression model, wherein a given sector of an image regresses towards the diffuse solar irradiance. Accordingly, such an embodiment includes localization of diffuse irradiance sources in (portions of) the sky.

Additionally, one or more embodiments of the invention include calculating the diffuse and direct irradiance obtained for each sector using a machine learning algorithm, and adjusting one or more photovoltaic modules (such as solar panels) and/or configurable add-ons to the sectors producing a higher amount of diffuse solar irradiance based on the output obtained from the machine learning algorithm.

As further detailed herein, at least one embodiment of the invention includes implementation of one or more sky cameras deployed in connection with a solar farm that includes one or more re-configurable add-ons. Additionally, the solar panels and/or add-ons of such a solar farm can be automatically or manually controlled and/or guided based at least in part on processed image data obtained by the one or more sky cameras. Such an embodiment can include improving yields of a photonic harvesting project carried out in connection with the solar farm.

As detailed herein, solar irradiance components include diffuse horizontal irradiance (DHI), direct normal irradiance (DNI), and global horizontal irradiance (GHI). DNI refers to the amount of solar radiation received per unit area by a surface that is perpendicular to incoming solar radiation. DHI refers to the amount of radiation received per unit area by a surface, wherein the radiation has been scattered by particles in the atmosphere and can reach the surface from multiple directions. GHI refers to the total amount of solar radiation received by a surface horizontal to the ground. Additionally, GHI includes both DNI and DHI. In one or more embodiments of the invention, DHI is a significant fraction of both GHI and DNI.

At least one embodiment of the invention includes calculating the optimal angle to maximize yield in a photonic harvesting setup with a flat solar panel and a single plane mirror (reflector) with an adjustable angle $\Theta$. For a given configuration angle $\Theta$, the set of available (non-occluded) "T" arcs are pre-computed with geometric view-point analysis during a system calibration phase. A machine learning model can be implemented as a regression function ($F_{sky}$) that is pre-trained to regress to solar irradiance components with a sector-wise spatial spread. The training data can include input sky image data (which can, for example, be preprocessed to enhance presence of light sources), sector-arc boundaries, total direct and diffuse irradiance measured at one or more points, and/or one or more weather measurements (temperature, wind speed, barometric pressure, etc.). The regression computed using a learning algorithm is then further constrained, such that the total measured irradiance is equally partitioned into the sectors. The training process can be improved, for example, with fine-grain training data that can include exclusively measured diffuse irradiance, etc.

In at least one embodiment of the invention, multiple sensors (or a network of sky cameras) are placed at appropriate distances to measure irradiance specific to multiple local sectors. A learning model can accept, as input, the individual sectors of an image and one or more local weather parameters. This model learns a representation of one or more portions of sky from image characteristics and external weather data. The output for the model can include produced values of sector-by-sector diffuse and direct solar irradiance. Additionally, using a network of pyranometers, one or more embodiments of the invention can include calculating each sector's individual diffuse and direct solar irradiance. This calculated value can then be used as the ground truth to learn the model. The model, which can include a machine learning model, regresses towards the correct diffuse solar irradiance.

Also, in one or more embodiments of the invention, ground surface diffuse irradiance can be measured using a masking approach to record the halo effect on the corners of each sky camera lens. The light sensed from the sky camera lens edges can be measured by comparing that sensed light with the expected irradiance determined from nearby regions. During a training phase, such a measurement can be validated with deployed sensors and/or other sky cameras.

FIG. 1 is a diagram illustrating system architecture, according to an embodiment of the invention. By way of illustration, FIG. 1 depicts a solar farm 102, which includes photovoltaic modules, add-on features, as well as one or more sky cameras 104. Additionally, as illustrated, FIG. 1 depicts a prediction module 106, which uses input from the sky cameras 104 to generate an output that is provided to a control system 108 (which is linked to the photovoltaic modules and add-on features of the solar farm 102).

More specifically, using the sky cameras 104 (that is, upward facing cameras with wide angled lenses that capture images of sky), one or more embodiments of the invention can include detecting diffuse irradiance sources in one or more portions of the sky. As further detailed herein, sky cameras can include cameras refactored for a set of special applications related to solar irradiance and cloud cover estimation and forecasting. In one or more embodiments of the invention, certain types of diffused light can be better captured with a halo disk suspended over a sky camera. As depicted in FIG. 1, sky cameras 104 can capture photographic images of the sky that are used as input by a prediction module 106.

In addition to now-casting (based on the input from the sky cameras 104), the prediction module 106 can perform future and/or near-time forecasting with respect to irradiance. For example, the prediction module 106 can compute direct and diffuse solar irradiance forecasting based at least in part on the sky camera images, and can subsequently provide such computations to the control system 108, which can, based on the provided forecast computations, configure the photovoltaic modules and/or add-on features of the solar farm 102 to generate higher yield(s).

Accordingly, and as further detailed herein, one or more embodiments of the invention include configuring one or more solar panels and/or one or more reflectors to increase solar energy yield. Such an embodiment includes using sky camera image data to predict which region(s) of a celestial dome is/are the brightest. The sky cameras can be implemented to monitor and/or capture data pertaining to clear sky regions and well as regions with cloud cover occluding the sun. At least one embodiment of the invention can additionally include determining levels of diffuse irradiance obtained and/or derived from terrestrial or ground sources and elements such as mountains, snow, salt, sand, high-rises, and/or other obstructions on the ground.

FIG. 2 is a diagram illustrating irradiance angles at different times of day, according to an exemplary embodiment of the invention. By way of illustration, FIG. 2 depicts a photovoltaic module 202 and a mirror 204. In the example depicted in FIG. 2, the angle ($\theta$) formed by the photovoltaic module 202 and the mirror 204 is 60 degrees. Accordingly, a reflection analysis (sun or cloud) of such a configuration includes 60 degrees of harvestable incident angles, while light from other directions can be occluded. If the amount of light harvested from angle portions A and B (corresponding to 11:00 AM and 12:00 PM, respectively) is greater than the amount of light lost from angle portions E and F (corresponding to 2:00 PM and 3:00 PM, respectively), a gain on DNI is expected.

Figure 3:
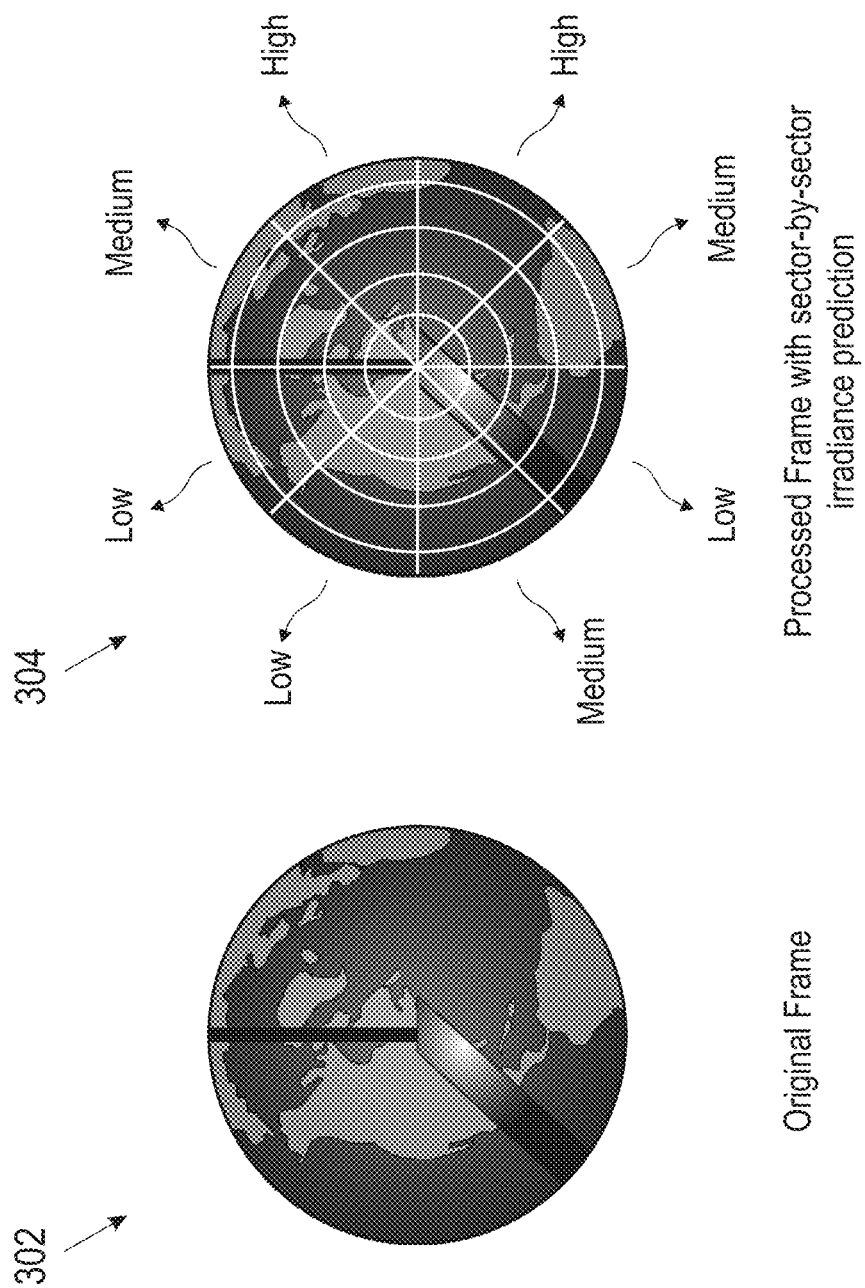
FIG. 3 is a diagram illustrating sky images with irradiance predictions, according to an exemplary embodiment of the invention.

FIG. 3 is a diagram illustrating sky images with irradiance predictions, according to an exemplary embodiment of the invention. By way of illustration, FIG. 3 depicts a sector-based approach of sky analysis, wherein element 302 depicts an original frame and element 304 depicts a processed frame with sector-by-sector irradiance prediction. Input data, from one or more sky cameras, used to generate a processed frame such as element 304 can include visible two-dimensional (2D) information, visible and near-infrared (NIR) 2D information, and/or three-dimensional (3D) projected images of the celestial dome. Additionally, in one or more embodiments of the invention (such as depicted in FIG. 3), the hemispherical region absorbed by the one or more sky cameras is partitioned into non-overlapping sections that are split by cross-sectional cuts with concentric circles.

By way of further example and/or illustration, at least one embodiment of the invention includes calculating the optimal angle to maximize yield in a photonic harvesting setup with a flat solar panel and a plane mirror (reflector) with an adjustable angle ($\Theta$). In such an embodiment, one or more sky cameras capture images I={ ... $I_{t-2}$, $I_{t-1}$, $I_{present(t)}$}. For a given configuration angle $\Theta$, the set of available (non-occluded) "T" arcs can be pre-computed via geometric view-point analysis during a system calibration phase. Additionally, a machine learning model can be learned and/or developed as a regression function ($F_{sky}$) that is pre-trained to regress to the solar irradiance components with a sector-wise spatial spread. Accordingly, in such an embodiment, [$R_{s\_1}$, $R_{s\_2}$, $R_{s\_3}$, ... , $R_{s\_k}$]=$F_{sky}$, wherein $R_{s\_p}$ is the irradiance vector for an arc s_p. The hemispherical region absorbed by the one or more relevant sky cameras is divided or partitioned into non-overlapping sections that are split by cross-sectional cuts with concentric circles. Each irradiance vector ($R_{s\_p}$) decouples the total irradiance into direct and diffuse components: $R_{s\_p}$=[$D_{s\_p}$, $Df_{s\_p}$] by $F_{sky}$. As noted above, $F_{sky}$ is defined as a regression function, which is a sub-routine with parameters that are typically obtained from a machine learning algorithm (hence the word pre-trained). The output of the function $F_{sky}$ includes generation of a vector R corresponding to each relevant section of the sky. The vector R is a two-tuple which contains both direct and diffused components. Hence, R is obtained by $F_{sky}$.

Further, in one or more embodiments of the invention, the available irradiance is given by $R_t^{\Theta_i}=\Sigma_k (T_k)$, and the problem of selecting the optimal angle is reduced to $\Theta_i$, corresponding to maximum irradiance (R) and time (t). If the degrees of freedom in connection with the implementation of such an embodiment are expanded, the available arcs T become a disjoint set of arcs. Also, in such an embodiment, the optimal angle $\Theta_i$ can be obtained by one or more linear programming (LP) methods.

Figure 4:
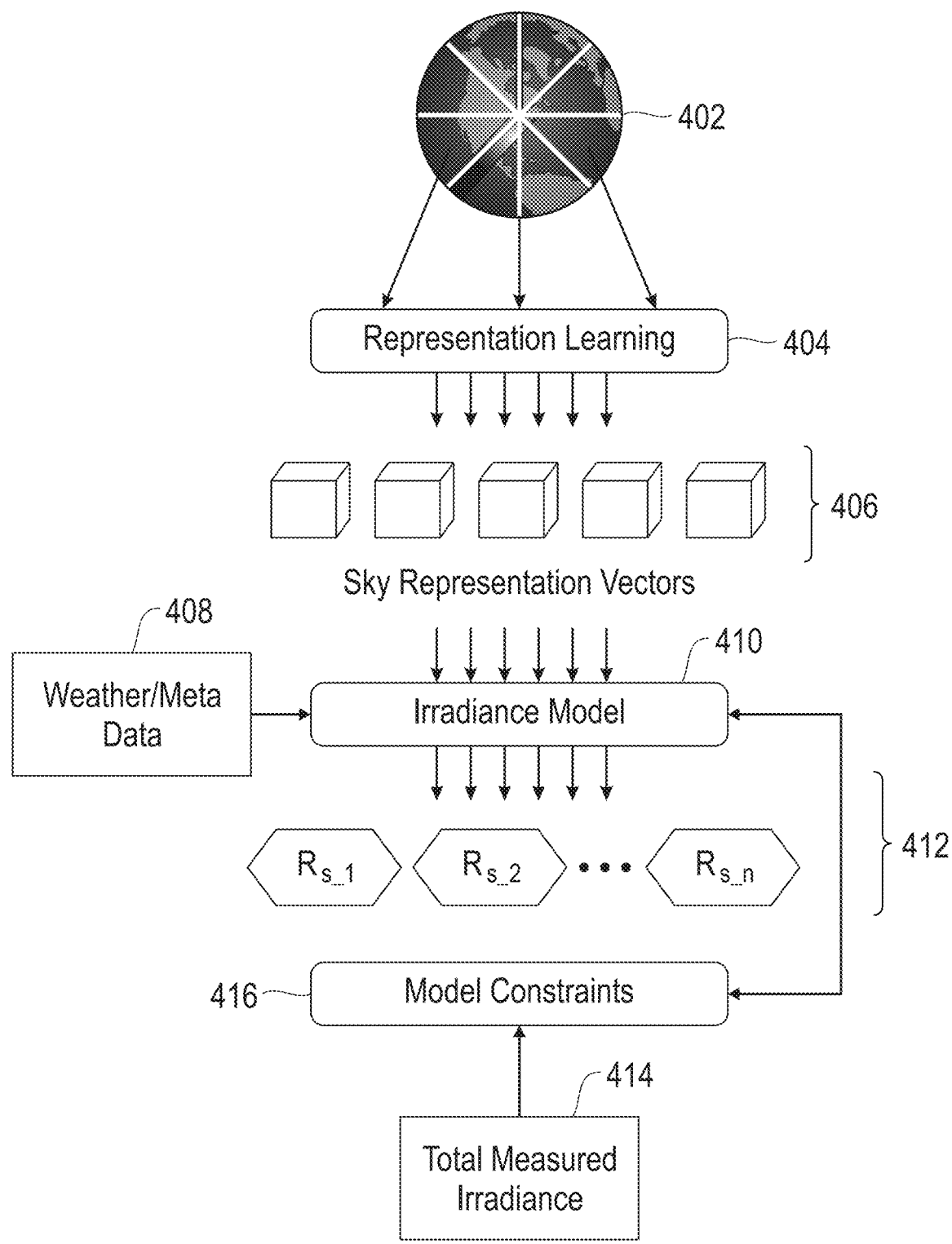
FIG. 4 is a flow diagram illustrating techniques according to an embodiment of the invention.

FIG. 4 is a flow diagram illustrating techniques according to an embodiment of the invention. As detailed herein, one or more embodiments of the invention can include, in a training phase, implementing a machine learning model that learns a function ($F_{sky}$) from sky camera input image(s), and performing an arc-sector decomposition of irradiance using measurements from a pyranometer. By way of illustration, FIG. 4 depicts a processed frame 402 of the hemispherical region absorbed by the sky camera(s), which is divided into non-overlapping sections that are split by cross-sectional cuts with concentric circles. Information derived from processed frame 402 can be provided to a representation learning component 404, which generates sky representation vectors 406. The sky representation vector includes the internal working of $F_{sky}$. In one or more embodiments of the invention, because $F_{sky}$ is a type of machine learning algorithm, the sky representation is a fixed length vector of real numbers that uniquely encodes a particular sector of the sky, generated by the algorithm corresponding to an image. The learning algorithm uses this vector to find R, the direct and diffused irradiance of the sector.

The sky representation vectors 406 are used by an irradiance model 410, which also receives input in the form of one or more items of weather data and/or metadata 408, whereby the irradiance model 410 generates and outputs irradiance vectors 412. In one or more embodiments of the invention, the metadata 408 can include additional information that may be directly or indirectly relevant to the prediction and forecast of irradiance. Such metadata 408 can include weather data sensed separately using special sensors, such as barometric pressure, ambient temperature, wind speed, etc. Such metadata 408 can also include details of surrounding terrain (such as reflective terrains including snow, salt plains etc.). As also depicted in FIG. 4, the irradiance model 410 interacts with one or more model constraints 416, which can include inputs in the form of total measured irradiance 414.

By way of further illustration, in at least one embodiment of the invention, training data can include input sky images (which can be, for example, pre-processed to enhance the presence of light sources), sector-arc boundaries, total direct and diffuse irradiance measured at the point $R_T$=[$D_T$,$Df_T$], and/or one or more weather measurements (temperature, wind speed, barometric pressure, etc.). Additionally, a regression is computed from a sky-representation obtained from an individual sector-arc region of the sky images and a part-irradiance vector $R_{s\_p}$=[$D_{s\_p}$, $Df_{s\_p}$]. The regression can be constrained such that the total measured irradiance is equally partitioned into the sectors, $R_T$=$\Sigma(R_s)$.

In one or more embodiments of the invention, such a training process may be improved via the use of fine-grain training data that can include diffuse irradiance data measured with a specialized diffuse irradiance measurement device (hallowed pyranometers, etc.), and/or arc-sector specific measurements obtained from multiple sensors or a network of sky cameras.

Accordingly, in at least one embodiment of the invention, a sector-based approach can include utilizing multiple sensors and/or sky cameras, placed at appropriate distances (from each other) to measure irradiance specific to a local sector. In such an embodiment, a learning model can accept as input these individual sectors of an image, as well as one or more local weather parameters. The learning model can learn a representation of the relevant portion(s) of sky from one or more image characteristics and external weather data.

As also detailed herein, in such an embodiment, each image obtained by the sky cameras can be divided into different sectors. The ground truth for each sector may be recorded using individual sensors. Further, using a regression model, a diffuse component of solar irradiance for each sector can be calculated. Output generated by the above-noted learning model output can include sector-by-sector produced amounts of diffuse and direct solar irradiance. Based at least in part on measurements from a network of pyranometers, such an embodiment can include calculating each sector's individual diffuse and direct solar irradiance. Such calculated values can be used, for example, as the ground truth to learn and/or develop the model. Further, in such an embodiment, a machine learning model regresses towards the correct diffuse solar irradiance, wherein such a machine learning model can include one or more deep learning techniques and/or deep learning models.

Such a machine learning model can be trained for a fixed location using a training sample, and the location can be chosen such that the location encounters multiple weather conditions (for improved and/or varied training of the model). Additionally, before deploying the model, local sensed data (for a given duration of time such as, for example, multiple weeks) can be used by one or more embodiments of the invention to fine-tune the model for a current geographical location.

Figure 5:
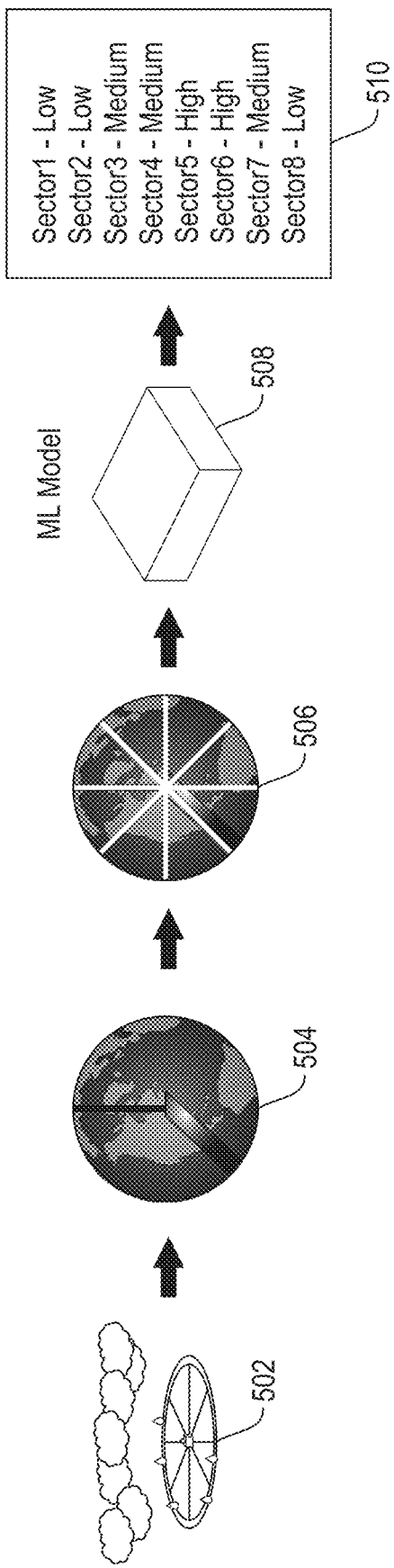
FIG. 5 is a flow diagram illustrating techniques according to an embodiment of the invention.

FIG. 5 is a flow diagram illustrating techniques according to an embodiment of the invention. Step 502 includes calculating the area of sky covered by a set of one or more sky cameras. In one or more embodiments of the invention, the area can include a circular area which can be divided into different equidistant sectors. Further, using an individual pyranometer, such an embodiment can include calculating the diffuse and direct irradiance obtained for each sector (and using such a calculation as the ground truth to train a learning model).

Step 504 includes pre-processing the image(s) obtained from the sky camera(s) using one or more vision techniques. Such vision techniques can include, for example, machine learning-based methods (regression, deep neural networks, etc.) and can depend on the nature of the data available and sky camera parameters. Additionally, such vision techniques can be applied, for example, in a sector-wise fashion to localize diffused light sources in the sky.

Step 506 includes dividing the image(s) into different sectors, and sending the data corresponding to each sector to a machine learning model. Step 508 includes implementing the machine learning model (for example, a regression model) for prediction and forecasting of diffuse irradiance. In an example embodiment of the invention, given a sector of an image, the machine learning model regresses towards the diffuse solar irradiance.

Further, step 510 includes calculating and outputting (via the machine learning model) produced amounts of diffuse and direct irradiance for each sector of the image(s). Using such outputs, one or more embodiments of the invention can include adjusting one or more photovoltaic modules (solar panels) and/or one or more configurable add-ons in relation to the one or more sectors which produce the maximum amount of diffuse solar irradiance.

As detailed herein, diffuse irradiance sources can include multiple sources such as, for example, ground surface diffuse irradiance, which can be measured using a masking approach to record the halo effect on the corners of a sky camera lens. The light sensed from the edges can be measured by comparison with the expected irradiance found from nearby regions. During a training phase, such a measurement can be validated with deployed sensors and/or other sky cameras.

Figure 6:
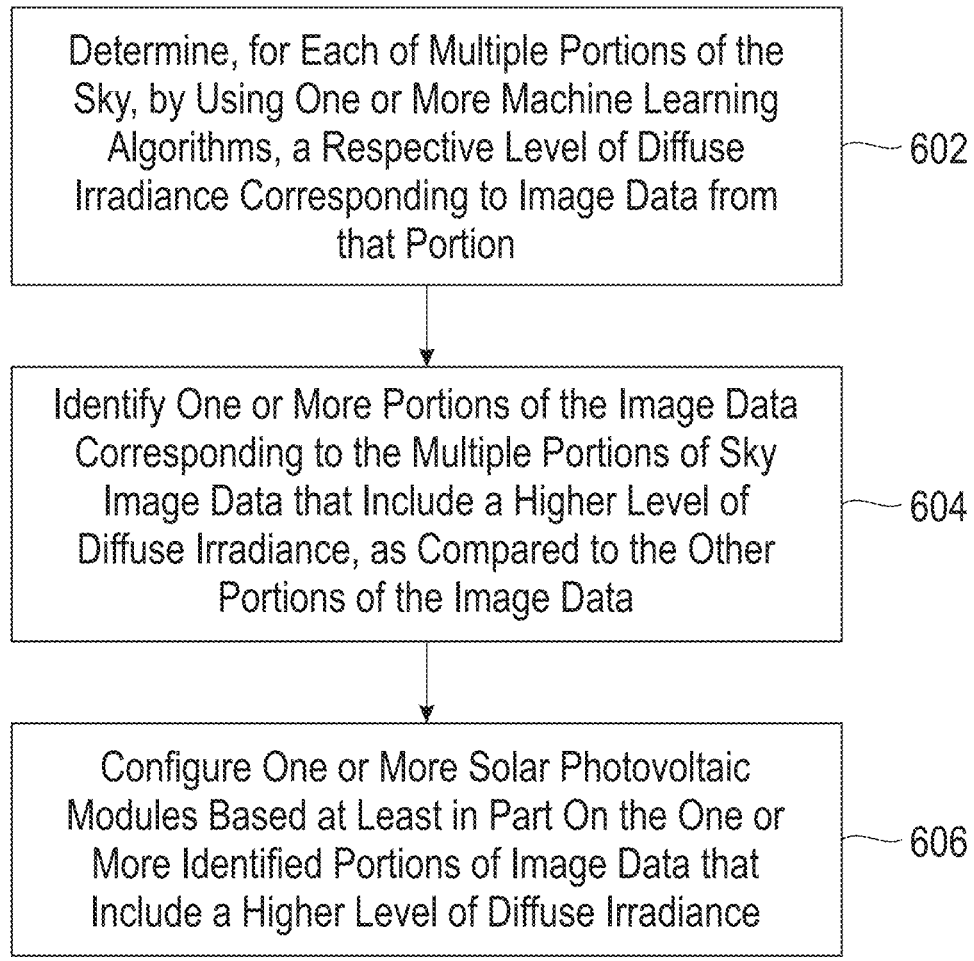
FIG. 6 is a flow diagram illustrating techniques according to an embodiment of the invention.

FIG. 6 is a flow diagram illustrating techniques according to an embodiment of the present invention. Step 602 includes determining, for each of multiple portions of the sky, by using one or more machine learning algorithms, a respective level of diffuse irradiance corresponding to image data from that portion, wherein the one or more machine learning algorithms comprise at least one regression function that analyzes irradiance vectors from image data corresponding to the multiple portions of the sky, and wherein the determining comprises, for the image data corresponding to each of the multiple portions of the sky, decoupling an irradiance vector into (i) a direct irradiance component and (ii) a diffuse irradiance component. The image data can include image data attributed to at least one clear sky region and/or image data attributed to at least one sky region containing one or more clouds. Additionally, at least one embodiment of the invention can include capturing the image data via one or more sky cameras, wherein the one or more sky cameras can include (i) one or more infrared cameras, (ii) one or more near-infrared cameras, (iii) one or more thermal cameras, and/or (iv) one or more cameras having lenses with different focal lengths.

Step 604 includes identifying one or more portions of the image data corresponding to the multiple portions of sky image data that include a higher (for example, above a given threshold) level of diffuse irradiance, as compared to other portions of the image data.

Step 606 includes configuring one or more solar photovoltaic modules based at least in part on the one or more identified portions of image data that include a higher level of diffuse irradiance. At least one embodiment of the invention also includes configuring one or more add-on features to the one or more solar photovoltaic modules based at least in part on the one or more identified portions of image data that include a higher level of diffuse irradiance. The one or more add-on features to the one or more solar photovoltaic modules can include one or more reflectors and/or one or more mirrors.

Additionally, in connection with the techniques depicted in FIG. 6, at least one embodiment of the invention can include repeating (i) step 602, (ii) step 604, and (iii) step 606 for one or more additional iterations. Repeating can include, for example, repeating (i) step 602, (ii) step 604, and (iii) step 606 for one or more additional iterations in accordance with a pre-determined temporal schedule.

The techniques depicted in FIG. 6 can also include predicting, based at least in part on the determined level of diffuse irradiance corresponding to image data from each of the multiple portions of the sky, a respective future level of diffuse irradiance corresponding to image data from each of the multiple portions of the sky. One or more embodiments of the invention can also include configuring one or more solar photovoltaic modules based at least in part on (i) the one or more identified portions of image data that include a higher level of diffuse irradiance and (ii) the predicted future level of diffuse irradiance corresponding to image data from each of the multiple portions of the sky. Such an embodiment can additionally include configuring one or more add-on features to the one or more solar photovoltaic modules based at least in part on (i) the one or more identified portions of image data that include a higher level of diffuse irradiance and (ii) the predicted future level of diffuse irradiance corresponding to image data from each of the multiple portions of the sky.

Also, the techniques depicted in FIG. 6 can include determining, using one or more machine learning algorithms, a respective level of diffuse irradiance corresponding to each of one or more terrain elements. Further, at least one embodiment of the invention includes configuring one or more solar photovoltaic modules based at least in part on (i) the one or more identified portions of image data that include a higher level of diffuse irradiance and (ii) the determined level of diffuse irradiance corresponding to each of the one or more terrain elements.

Also, an additional embodiment of the invention includes generating a machine learning model for determining irradiance levels, wherein the machine learning model is based at least in part on (i) sky image data captured over a temporal period and (ii) one or more weather conditions, corresponding to the sky image data, sensed over the temporal period. Such an embodiment can also include capturing, using multiple cameras, image data specific to one or more regions of sky, sensing one or more transient weather conditions at geographic regions corresponding to the one or more regions of sky, and applying the machine learning model to (i) the captured image data specific to the one or more regions of sky and (ii) the one or more transient weather conditions sensed at the geographic regions corresponding to the one or more regions of sky. Further, such an embodiment can include outputting, based on implementation of the machine learning model, (i) sector-by-sector levels of produced diffuse irradiance and (ii) sector-by-sector levels of produced direct irradiance; and configuring one or more solar photovoltaic modules based at least in part on (i) the sector-by-sector levels of produced diffuse irradiance and (ii) the sector-by-sector levels of produced direct irradiance.

The techniques depicted in FIG. 6 can also, as described herein, include providing a system, wherein the system includes distinct software modules, each of the distinct software modules being embodied on a tangible computer-readable recordable storage medium. All of the modules (or any subset thereof) can be on the same medium, or each can be on a different medium, for example. The modules can include any or all of the components shown in the figures and/or described herein. In an embodiment of the invention, the modules can run, for example, on a hardware processor. The method steps can then be carried out using the distinct software modules of the system, as described above, executing on a hardware processor. Further, a computer program product can include a tangible computer-readable recordable storage medium with code adapted to be executed to carry out at least one method step described herein, including the provision of the system with the distinct software modules.

Additionally, the techniques depicted in FIG. 6 can be implemented via a computer program product that can include computer useable program code that is stored in a computer readable storage medium in a data processing system, and wherein the computer useable program code was downloaded over a network from a remote data processing system. Also, in an embodiment of the invention, the computer program product can include computer useable program code that is stored in a computer readable storage medium in a server data processing system, and wherein the computer useable program code is downloaded over a network to a remote data processing system for use in a computer readable storage medium with the remote system.

An embodiment of the invention or elements thereof can be implemented in the form of an apparatus including a memory and at least one processor that is coupled to the memory and configured to perform exemplary method steps.

Figure 7:
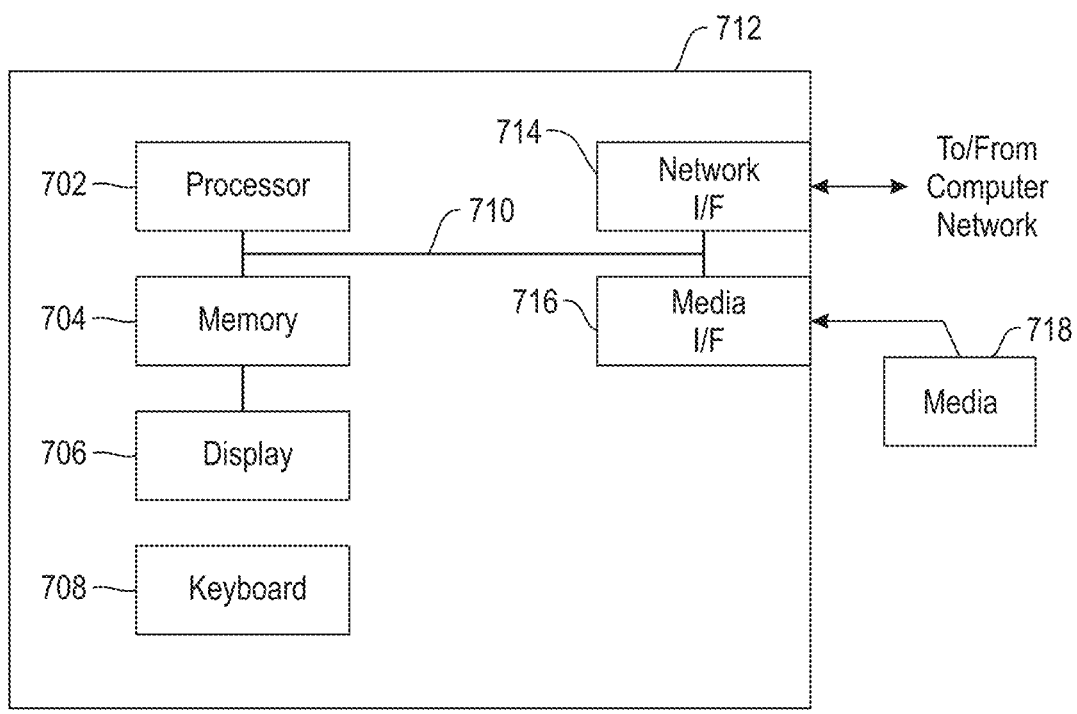
FIG. 7 is a system diagram of an exemplary computer system on which at least one embodiment of the invention can be implemented.

Additionally, an embodiment of the present invention can make use of software running on a computer or workstation. With reference to FIG. 7, such an implementation might employ, for example, a processor 702, a memory 704, and an input/output interface formed, for example, by a display 706 and a keyboard 708. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory), ROM (read only memory), a fixed memory device (for example, hard drive), a removable memory device (for example, diskette), a flash memory and the like. In addition, the phrase "input/output interface" as used herein, is intended to include, for example, a mechanism for inputting data to the processing unit (for example, mouse), and a mechanism for providing results associated with the processing unit (for example, printer). The processor 702, memory 704, and input/output interface such as display 706 and keyboard 708 can be interconnected, for example, via bus 710 as part of a data processing unit 712. Suitable interconnections, for example via bus 710, can also be provided to a network interface 714, such as a network card, which can be provided to interface with a computer network, and to a media interface 716, such as a diskette or CD-ROM drive, which can be provided to interface with media 718.

Accordingly, computer software including instructions or code for performing the methodologies of the invention, as described herein, may be stored in associated memory devices (for example, ROM, fixed or removable memory) and, when ready to be utilized, loaded in part or in whole (for example, into RAM) and implemented by a CPU. Such software could include, but is not limited to, firmware, resident software, microcode, and the like.

A data processing system suitable for storing and/or executing program code will include at least one processor 702 coupled directly or indirectly to memory elements 704 through a system bus 710. The memory elements can include local memory employed during actual implementation of the program code, bulk storage, and cache memories which provide temporary storage of at least some program code in order to reduce the number of times code must be retrieved from bulk storage during implementation.

Input/output or I/O devices (including, but not limited to, keyboards 708, displays 706, pointing devices, and the like) can be coupled to the system either directly (such as via bus 710) or through intervening I/O controllers (omitted for clarity).

Network adapters such as network interface 714 may also be coupled to the system to enable the data processing system to become coupled to other data processing systems or remote printers or storage devices through intervening private or public networks. Modems, cable modems and Ethernet cards are just a few of the currently available types of network adapters.

As used herein, including the claims, a "server" includes a physical data processing system (for example, system 712 as shown in FIG. 7) running a server program. It will be understood that such a physical server may or may not include a display and keyboard.

The present invention may be a system, a method, and/or a computer program product at any possible technical detail level of integration. The computer program product may include a computer readable storage medium (or media) having computer readable program instructions thereon for causing a processor to carry out embodiments of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform embodiments of the present invention.

Embodiments of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It should be noted that any of the methods described herein can include an additional step of providing a system comprising distinct software modules embodied on a computer readable storage medium; the modules can include, for example, any or all of the components detailed herein. The method steps can then be carried out using the distinct software modules and/or sub-modules of the system, as described above, executing on a hardware processor 702. Further, a computer program product can include a computer-readable storage medium with code adapted to be implemented to carry out at least one method step described herein, including the provision of the system with the distinct software modules.

In any case, it should be understood that the components illustrated herein may be implemented in various forms of hardware, software, or combinations thereof, for example, application specific integrated circuit(s) (ASICS), functional circuitry, an appropriately programmed digital computer with associated memory, and the like. Given the teachings of the invention provided herein, one of ordinary skill in the related art will be able to contemplate other implementations of the components of the invention.

Additionally, it is understood in advance that implementation of the teachings recited herein are not limited to a particular computing environment. Rather, embodiments of the present invention are capable of being implemented in conjunction with any type of computing environment now known or later developed.

For example, cloud computing is a model of service delivery for enabling convenient, on-demand network access to a shared pool of configurable computing resources (for example, networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (for example, country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (for example, storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (for example, web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (for example, host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (for example, mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (for example, cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 8:
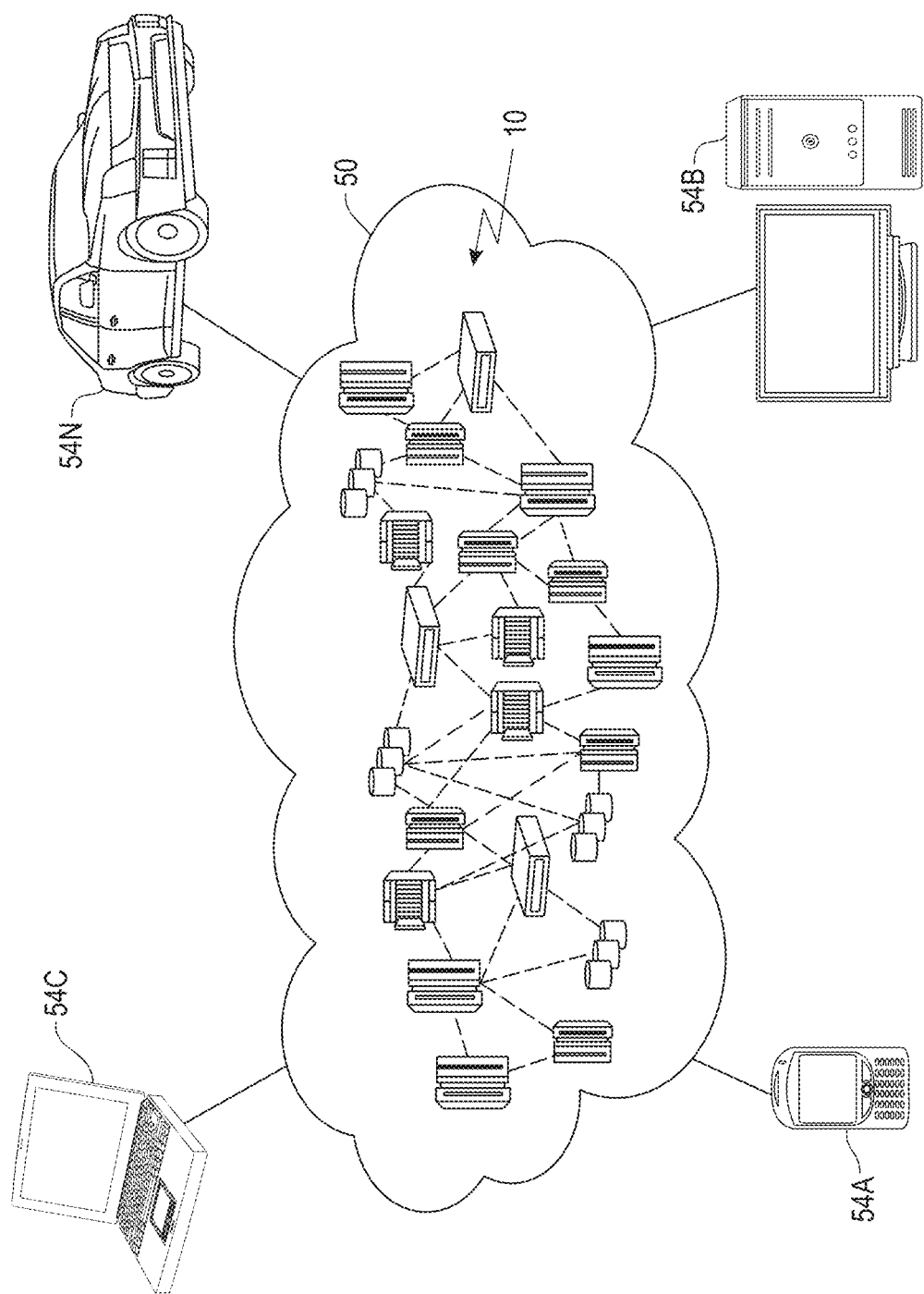
FIG. 8 depicts a cloud computing environment according to an embodiment of the present invention.

Referring now to FIG. 8, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 8 are intended to be illustrative only and that computing nodes 10 and cloud computing environment 50 can communicate with any type of computerized device over any type of network and/or network addressable connection (e.g., using a web browser).

Figure 9:
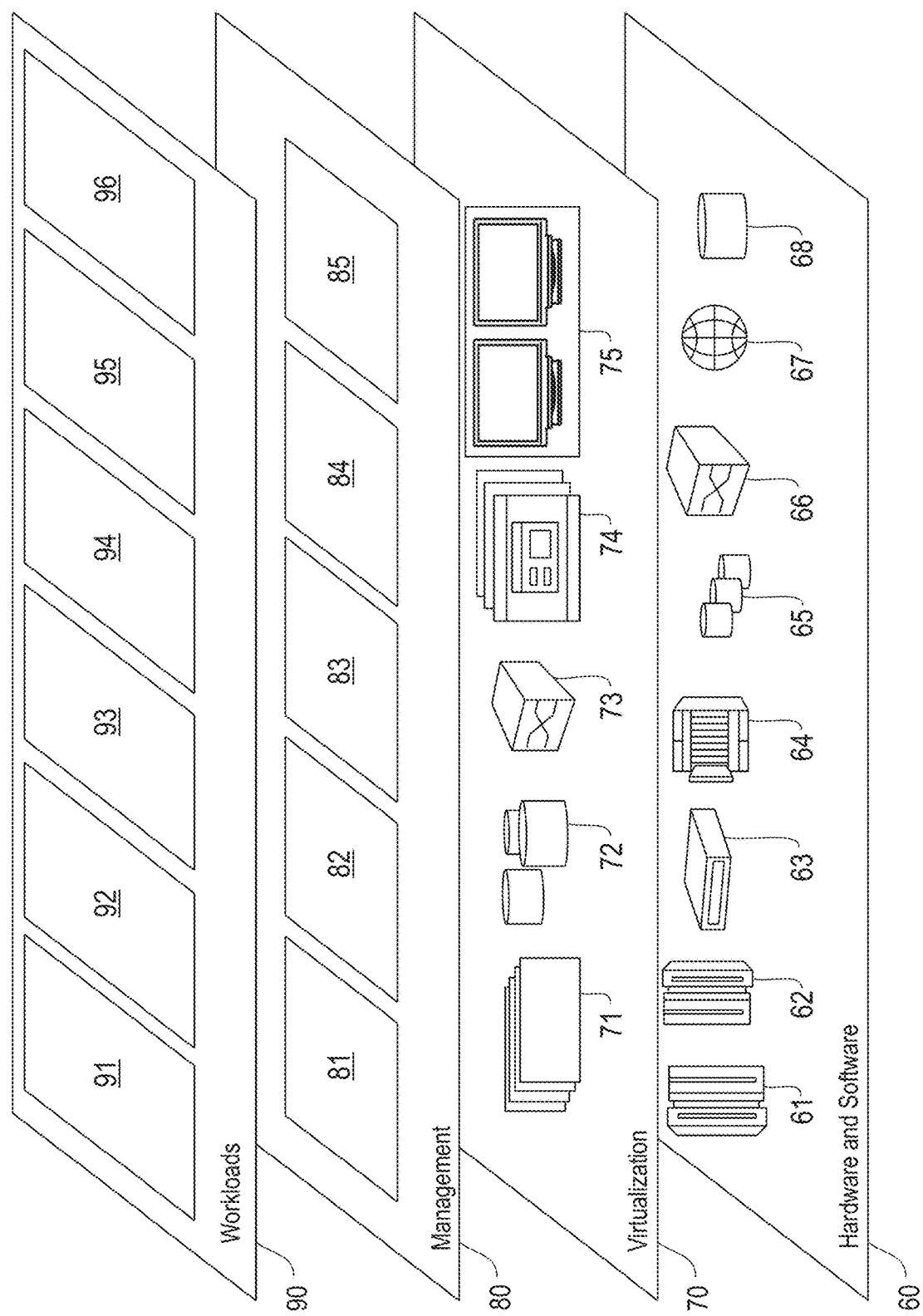
FIG. 9 depicts abstraction model layers according to an embodiment of the present invention.

Referring now to FIG. 9, a set of functional abstraction layers provided by cloud computing environment 50 (FIG. 8) is shown. It should be understood in advance that the components, layers, and functions shown in FIG. 9 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75. In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources.

In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and irradiance-based photovoltaic module configuration 96, in accordance with the one or more embodiments of the present invention.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, steps, operations, elements, and/or components, but do not preclude the presence or addition of another feature, step, operation, element, component, and/or group thereof.

At least one embodiment of the present invention may provide a beneficial effect such as, for example, dividing a circular area into different equidistant sectors for predicting diffuse irradiance.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method, the method comprising:
    capturing image data from multiple portions of the sky using a network of multiple sky cameras, wherein the multiple sky cameras comprise (i) one or more infrared cameras, (ii) one or more thermal cameras, and (iii) one or more cameras having lenses with different focal lengths;
    determining, for each of the multiple portions of the sky, by using one or more machine learning algorithms, a respective level of diffuse irradiance corresponding to the image data from that portion, wherein the one or more machine learning algorithms comprise at least one regression function that analyzes irradiance vectors from image data corresponding to the multiple portions of the sky, and wherein said determining comprises, for the image data corresponding to each of the multiple portions of the sky, decoupling an irradiance vector into (i) a direct irradiance component and (ii) a diffuse irradiance component;
    identifying one or more portions of the image data corresponding to the multiple portions of sky image data that include a higher level of diffuse irradiance, as compared to other portions of the image data; and
    configuring one or more solar photovoltaic modules based at least in part on the one or more identified portions of image data that include a higher level of diffuse irradiance;
    wherein the method is carried out by at least one computing device.

2. The computer-implemented method of claim 1, wherein the image data comprise image data attributed to at least one clear sky region.

3. The computer-implemented method of claim 1, wherein the image data comprise image data attributed to at least one sky region containing one or more clouds.

4. The computer-implemented method of claim 1, comprising:
    configuring one or more add-on features to the one or more solar photovoltaic modules based at least in part on the one or more identified portions of image data that include a higher level of diffuse irradiance.

5. The computer-implemented method of claim 4, wherein the one or more add-on features to the one or more solar photovoltaic modules comprises at least one of (i) one or more reflectors and (ii) one or more mirrors.

6. The computer-implemented method of claim 1, comprising:
    repeating (i) said determining, (ii) said identifying, and (iii) said configuring for one or more additional iterations.

7. The computer-implemented method of claim 1, comprising:
    predicting, based at least in part on the determined level of diffuse irradiance corresponding to image data from each of the multiple portions of the sky, a respective future level of diffuse irradiance corresponding to image data from each of the multiple portions of the sky.

8. The computer-implemented method of claim 7, comprising:
    configuring one or more solar photovoltaic modules based at least in part on (i) the one or more identified portions of image data that include a higher level of diffuse irradiance and (ii) the predicted future level of diffuse irradiance corresponding to image data from each of the multiple portions of the sky.

9. The computer-implemented method of claim 7, comprising:
    configuring one or more add-on features to the one or more solar photovoltaic modules based at least in part on (i) the one or more identified portions of image data that include a higher level of diffuse irradiance and (ii) the predicted future level of diffuse irradiance corresponding to image data from each of the multiple portions of the sky.

10. The computer-implemented method of claim 1, comprising:
   determining, using one or more machine learning algorithms, a respective level of diffuse irradiance corresponding to each of one or more terrain elements.

11. The computer-implemented method of claim 10, comprising:
   configuring one or more solar photovoltaic modules based at least in part on (i) the one or more identified portions of image data that include a higher level of diffuse irradiance and (ii) the determined level of diffuse irradiance corresponding to each of the one or more terrain elements.

12. A computer program product comprising a computer readable storage medium having program instructions embodied therewith, the program instructions executable by a computing device to cause the computing device to:
   capture image data from multiple portions of the sky using a network of multiple sky cameras, wherein the multiple sky cameras comprise (i) one or more infrared cameras, (ii) one or more thermal cameras, and (iii) one or more cameras having lenses with different focal lengths;
   determine, for each of the multiple portions of the sky, by using one or more machine learning algorithms, a respective level of diffuse irradiance corresponding to the image data from that portion, wherein the one or more machine learning algorithms comprise at least one regression function that analyzes irradiance vectors from image data corresponding to the multiple portions of the sky, and wherein said determining comprises, for the image data corresponding to each of the multiple portions of the sky, decoupling an irradiance vector into (i) a direct irradiance component and (ii) a diffuse irradiance component;
   identify one or more portions of the image data corresponding to the multiple portions of sky image data that include a higher level of diffuse irradiance, as compared to other portions of the image data; and
   configure one or more solar photovoltaic modules based at least in part on the one or more identified portions of image data that include a higher level of diffuse irradiance.

13. The computer program product of claim 12, wherein the program instructions executable by a computing device further cause the computing device to:
   configure one or more add-on features to the one or more solar photovoltaic modules based at least in part on the one or more identified portions of image data that include a higher level of diffuse irradiance.

14. The computer program product of claim 12, wherein the program instructions executable by a computing device further cause the computing device to:
   predict, based at least in part on the determined level of diffuse irradiance corresponding to image data from each of the multiple portions of the sky, a respective future level of diffuse irradiance corresponding to image data from each of the multiple portions of the sky.

15. The computer program product of claim 14, wherein the program instructions executable by a computing device further cause the computing device to:
   configure one or more solar photovoltaic modules based at least in part on (i) the one or more identified portions of image data that include a higher level of diffuse irradiance and (ii) the predicted future level of diffuse irradiance corresponding to image data from each of the multiple portions of the sky.

16. The computer program product of claim 14, wherein the program instructions executable by a computing device further cause the computing device to:
   configure one or more add-on features to the one or more solar photovoltaic modules based at least in part on (i) the one or more identified portions of image data that include a higher level of diffuse irradiance and (ii) the predicted future level of diffuse irradiance corresponding to image data from each of the multiple portions of the sky.

17. A system comprising:
   a memory; and
   at least one processor operably coupled to the memory and configured for:
      capturing image data from multiple portions of the sky using a network of multiple sky cameras, wherein the multiple sky cameras comprise (i) one or more infrared cameras, (ii) one or more thermal cameras, and (iii) one or more cameras having lenses with different focal lengths;
      determining, for each of the multiple portions of the sky, by using one or more machine learning algorithms, a respective level of diffuse irradiance corresponding to the image data from that portion, wherein the one or more machine learning algorithms comprise at least one regression function that analyzes irradiance vectors from image data corresponding to the multiple portions of the sky, and wherein said determining comprises, for the image data corresponding to each of the multiple portions of the sky, decoupling an irradiance vector into (i) a direct irradiance component and (ii) a diffuse irradiance component;
      identifying one or more portions of the image data corresponding to the multiple portions of sky image data that include a higher level of diffuse irradiance, as compared to other portions of the image data; and
      configuring one or more solar photovoltaic modules based at least in part on the one or more identified portions of image data that include a higher level of diffuse irradiance.

18. A computer-implemented method, the method comprising:
   generating a machine learning model for determining irradiance levels, wherein the machine learning model is based at least in part on (i) sky image data captured over a temporal period and (ii) one or more weather conditions, corresponding to the sky image data, sensed over the temporal period;
   capturing, using a network of multiple sky cameras, image data specific to one or more regions of sky, wherein the multiple sky cameras comprise (i) one or more infrared cameras, (ii) one or more thermal cameras, and (iii) one or more cameras having lenses with different focal lengths;
   sensing one or more transient weather conditions at geographic regions corresponding to the one or more regions of sky;
   applying the machine learning model to (i) the captured image data specific to the one or more regions of sky and (ii) the one or more transient weather conditions sensed at the geographic regions corresponding to the one or more regions of sky;
outputting, based on implementation of the machine learning model, (i) sector-by-sector levels of produced diffuse irradiance and (ii) sector-by-sector levels of produced direct irradiance; and
configuring one or more solar photovoltaic modules based at least in part on (i) the sector-by-sector levels of produced diffuse irradiance and (ii) the sector-by-sector levels of produced direct irradiance;
wherein the method is carried out by at least one computing device.

\* \* \* \* \*